United States Patent
Chao-Huan (10) Patent No.: US 7,140,361 B1
(45) Date of Patent: Nov. 28, 2006

(54) STONE CUTTER HAVING BLADE ANGLE ADJUSTMENT DEVICE

(76) Inventor: Teng Chao-Huan, P.O. Box 697, Fongyuan City, Taichung County (TW) 420

( * ) Notice: Subject to any disclaimer, the term of this patent is extended or adjusted under 35 U.S.C. 154(b) by 152 days.

(21) Appl. No.: 10/836,222

(22) Filed: May 3, 2004

(51) Int. Cl.
*B28D 1/04* (2006.01)
*B28D 1/143* (2006.01)

(52) U.S. Cl. ............... 125/13.01; 83/477.1; 83/477.2; 83/581

(58) Field of Classification Search ............. 125/13.01, 125/13.03; 83/177, 581, 435.11, 477.1, 477.2
See application file for complete search history.

(56) References Cited

U.S. PATENT DOCUMENTS

| | | | | |
|---|---|---|---|---|
| 1,735,178 A | * | 11/1929 | Pittman | ................. 83/488 |
| 4,428,159 A | * | 1/1984 | Sigetich et al. | ............. 451/213 |
| 5,004,029 A | * | 4/1991 | Garner | ................. 144/287 |
| 6,276,990 B1 | * | 8/2001 | Greenland | ............... 451/11 |
| 6,283,110 B1 | * | 9/2001 | Lee | ................. 125/13.01 |
| 6,439,218 B1 | * | 8/2002 | Hulett | ............... 125/13.01 |
| 6,581,656 B1 | * | 6/2003 | Harper | ................. 144/287 |
| 6,637,424 B1 | * | 10/2003 | Fuhrman et al. | ............. 125/35 |
| 6,932,075 B1 | * | 8/2005 | Tsao | ................. 125/13.01 |

* cited by examiner

*Primary Examiner*—M. Rachuba (57) ABSTRACT

A stone cutter having blade angle adjustment device includes a rectangular base having a pair of sliding bars, three cutting grooves of different slanting sections and two alignment of rectangular through hole in the top, a pair of hollow interior rectangular bars at two ends for respectively receiving a pair of lateral rods of a U-shaped extension and a sink on underside thereof. A salver plate slidably disposes on the sliding bars. A pair of support arms spacedly dispose on the top of the salver plate each having a first circular through hole and three second through hole in an arcuate slot in upper portion respectively engaged with a pair of first screw holes and a pair of second screw holes of a motor which is secured on the top of the salver plate between the support arms, a guarded blade secured to the axis of the motor and a pair of handled locks selectively engaged with one of the three second circular through holes to adjust the different slanting angles for the blade.

2 Claims, 11 Drawing Sheets

STONE CUTTER HAVING BLADE ANGLE ADJUSTMENT DEVICE

BACKGROUND OF THE INVENTION

The present invention relates to the stone cutters and more particularly to a stone cutter having blade angle adjustment device.

Figure 1:
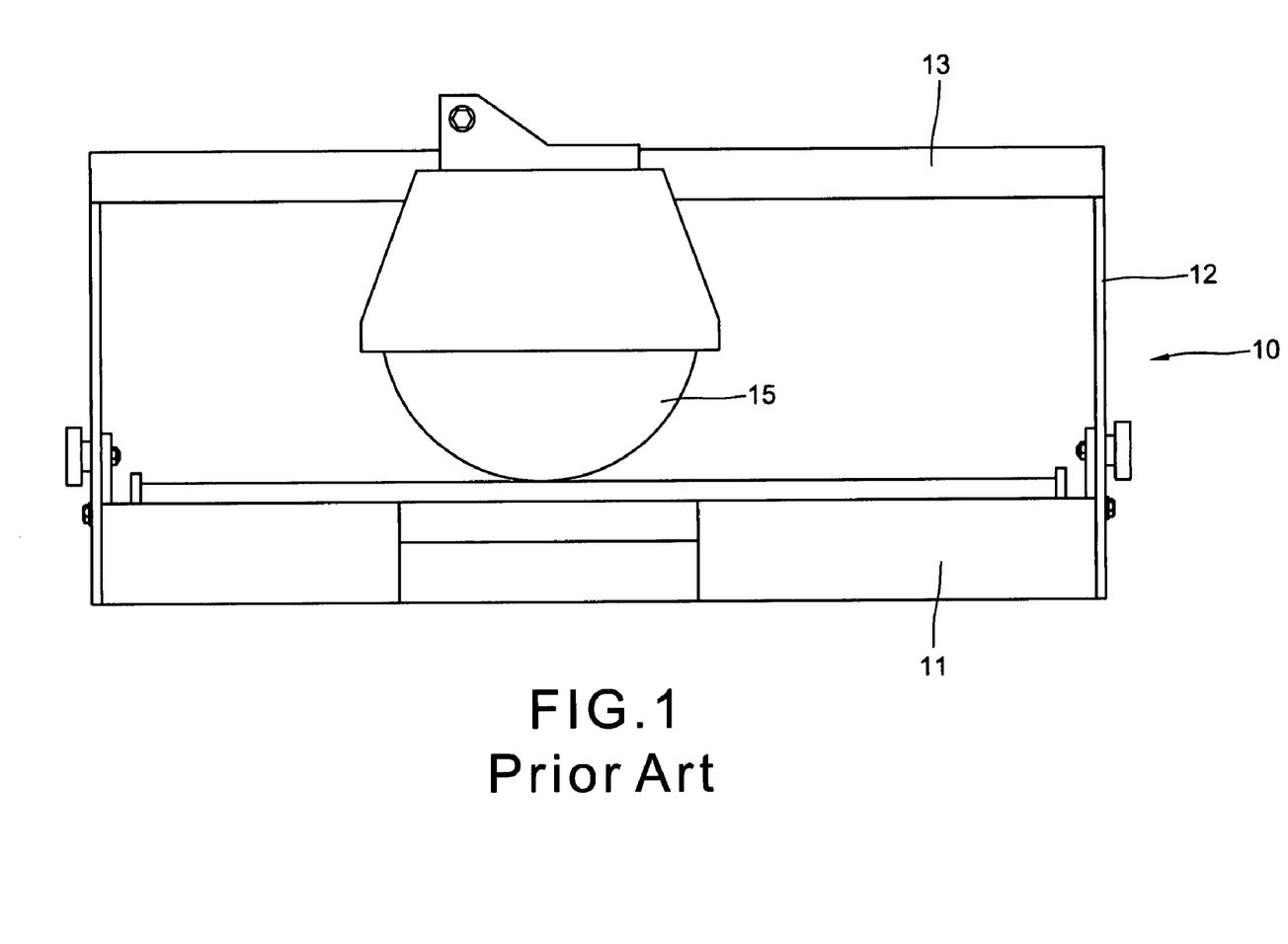
FIGS. 1 to 3 are the plane views of a stone cutter according to a prior art.
Figure 2:
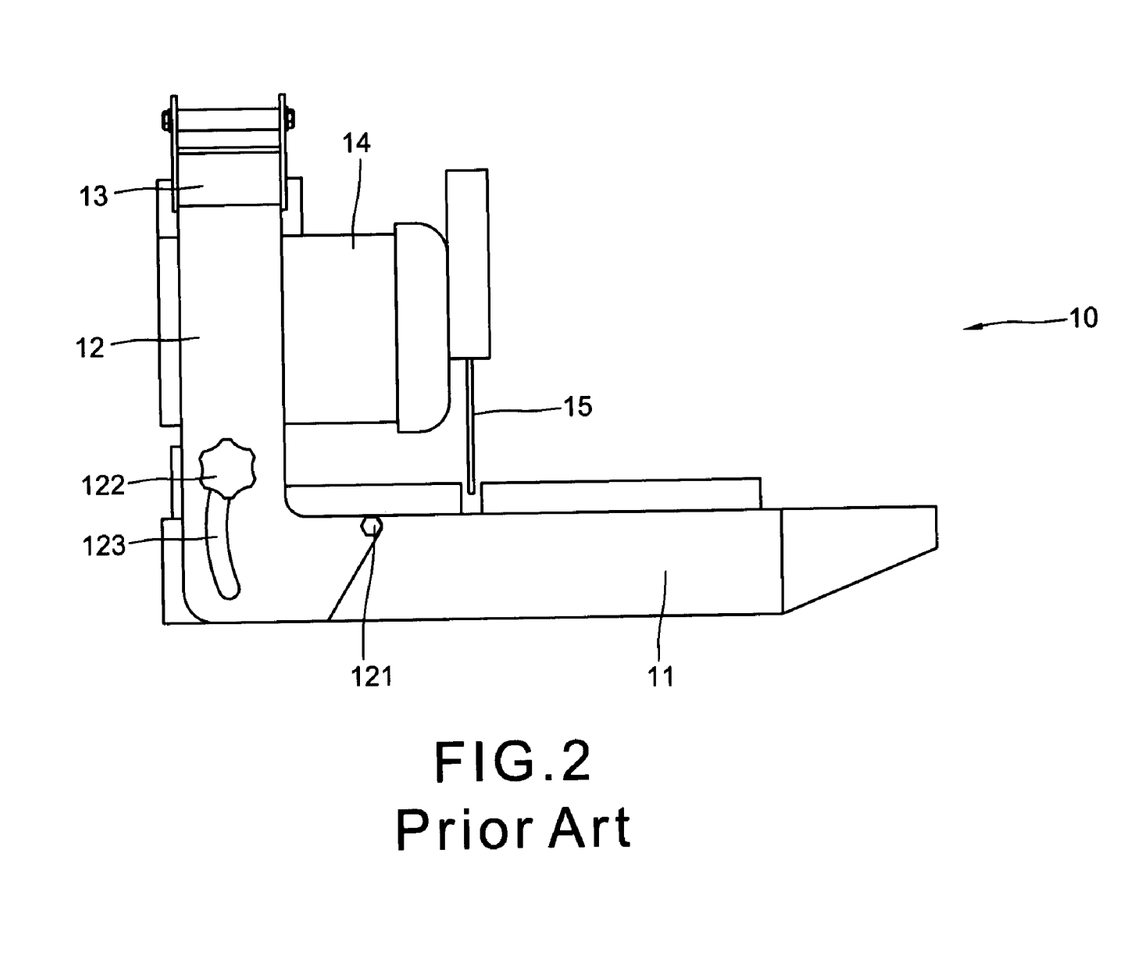
Figure 3:
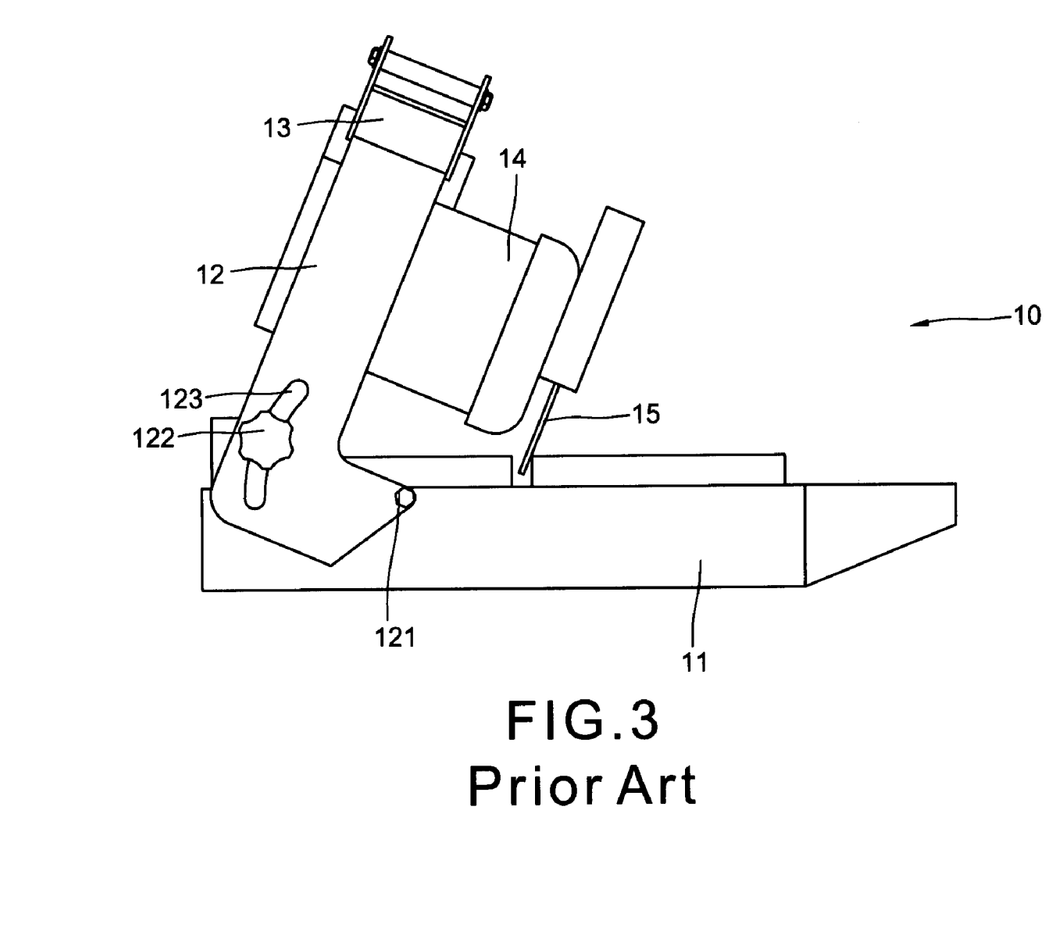

A blade angle adjustment device in a stone cutter provides great convenience to an operator who turns the motor including the blade to easily adjust a desired slanting cutting angle. FIGS. 1, 2 and 3 show a prior art stone cutter 10 which has a base 11, a pair of support arms 12 parallel secured to the lateral sides of the base 11, a lateral beam 13 for slidably suspending from a motor 14 which operates a blade 15 on an inner end. Each of the support arms 12 is secured to the base by a knob locks 122 through an arcuate slot 123 in the lower end of the support arms 12.

When unfastens the knob locks 122, the motor including the blade are turned a desired slanting angle relative the upper surface of the base 11. Due to the pivoting point of the motor 14 and the blade 15 are entirely concentrated on the knob locks 122, the operator has to apply great strength on the adjustment of the cutting angle by one hand swinging the motor 14 and the other hand operating the knob locks 122. Besides, the weight of the motor 14 always loaded up on the lateral beam 13 which is breakable.

SUMMARY OF THE PRESENT INVENTION

The present invention has a main object to provide a stone cutter having blade angle adjustment device in which the weight of the motor and blade are concentrated on a pair support arms and a salver plate, and the pivoting points are on the pair of handle locks that facilitates the adjustment of the slanting angle for the motor and blade and elongates the durability of the cutter.

Accordingly, the stone cutter of the present invention comprises generally a base having a pair of sliding bars, a plurality of positioning plates and cutting grooves, a salver plate having a plurality of rollers on underside enabling the salver plate slid about the sliding bars, a motor having a guarded blade on inner end pivoted to an inner surface of the salver plate, a pair of supporting arms parallel secured to the top of the salver plate positioned on two sides of the motor respectively and each having an arcuate slot with three positioning through hole formed spaced apart therein respectively engageable with a screw hole in each lateral side of the motor and a pair of handled locks selectively lock the support arms to the motor via one of the through holes of the arcuate slot. When unfasten the handle locks, the motor together with the blade will be automatically turned up or down to facilitate the operator to adjust a slanting angle for the blade. Then fastened the knob locks via another through hole of the arcuate slot such that the adjustment of the slanting angle is easily accomplished.

The present invention will become more fully understood by reference to the following detailed description thereof when read in conjunction with the attached drawings.

DETAILED DESCRIPTION OF THE PREFERRED EMBODIMENT

Figure 4:
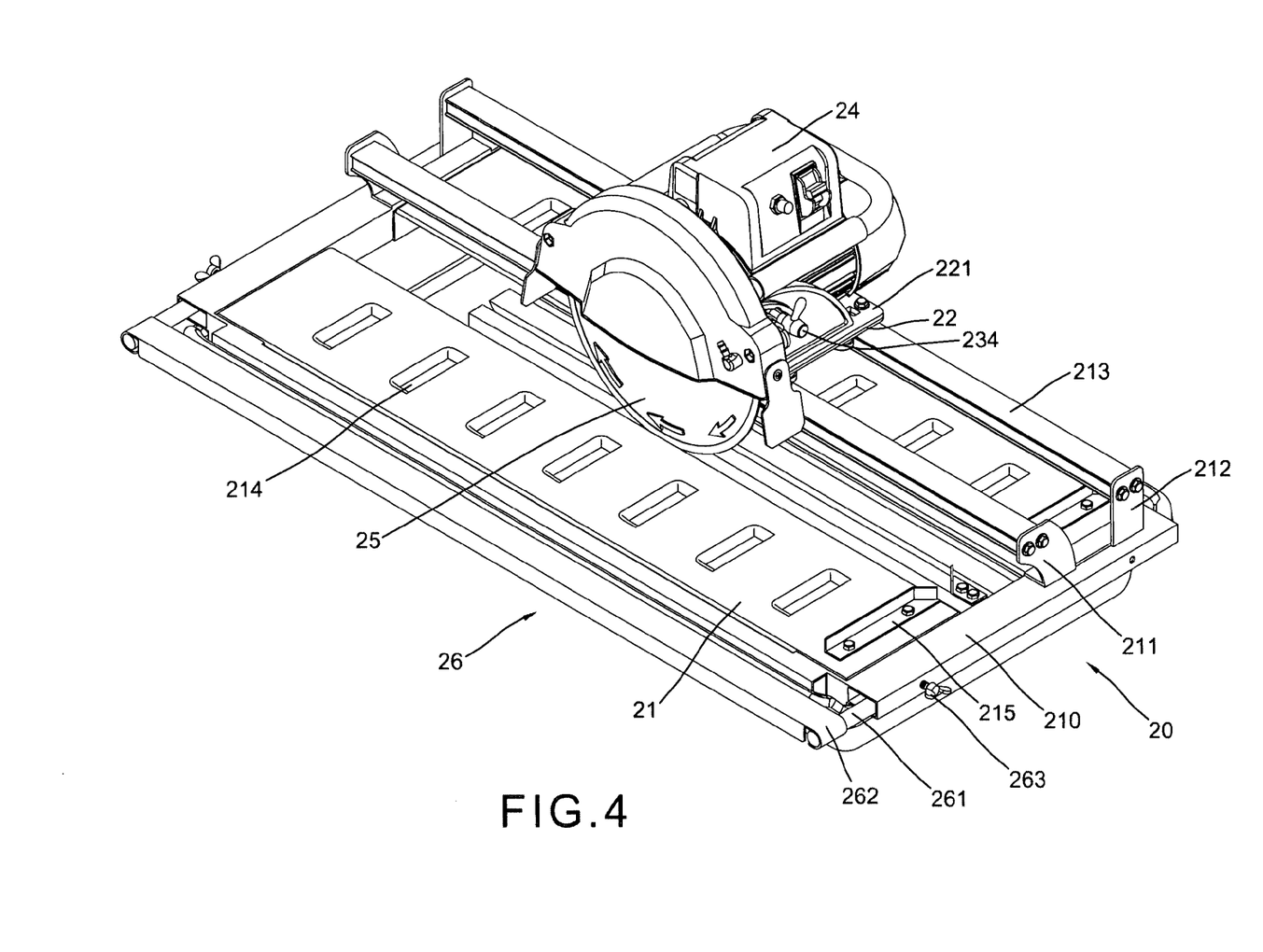
FIG. 4 is a perspective view to show the preferred embodiment of a stone cutter according to the present invention.
Figure 5:
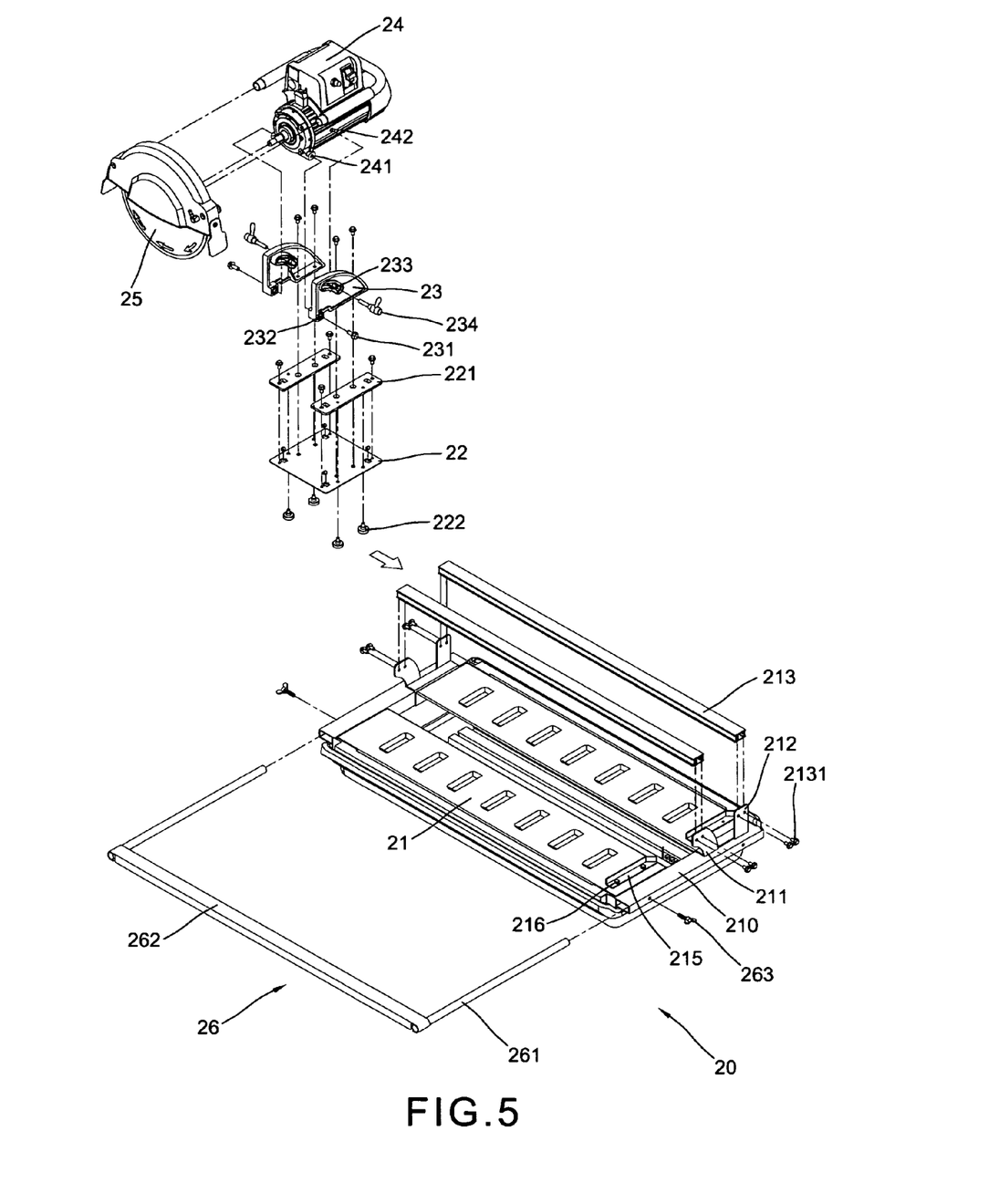
FIG. 5 is an exploded perspective of FIG. 4.

With reference to FIGS. 4 and 5 of the drawings, the stone cutter 20 of the present invention comprises a rectangular base 21 having two pairs of support plates 211 and 212 spacedly formed on two ends of the base for securing a pair of longitudinal sliding bars 213 which are parallel secured to the top of the support plates 211 and 212, two alignments of rectangular through holes 214 spacedly formed in the base 21 for discharging the sawdusts into a sink under the base 21, a plurality of positioning plates 215 secured to a top adjacent one end of the base by screws 216 which is provided for engaging a working piece on the base 21, three cutting longitudinal grooves 217, 218 and 219 of different slanting angles parallel formed in a central top of the base 21 (as show in FIG. 6) and a pair of hollow interior rectangular bars 210 respectively secured to two ends of the base for slidably receiving a pair of lateral rod 261 of a U-shaped extension 26 which is provided to cope with a large sized working piece and fastened by a pair of handle locks 263.

Figure 6:
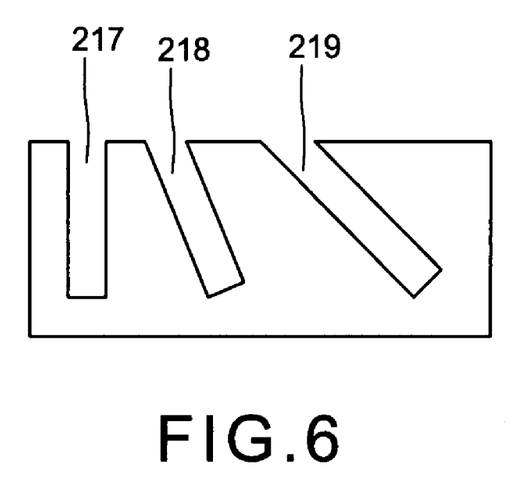
FIG. 6 is a plane view to show the cutting grooves of different slanting angles in the top of a base.
Figure 7:
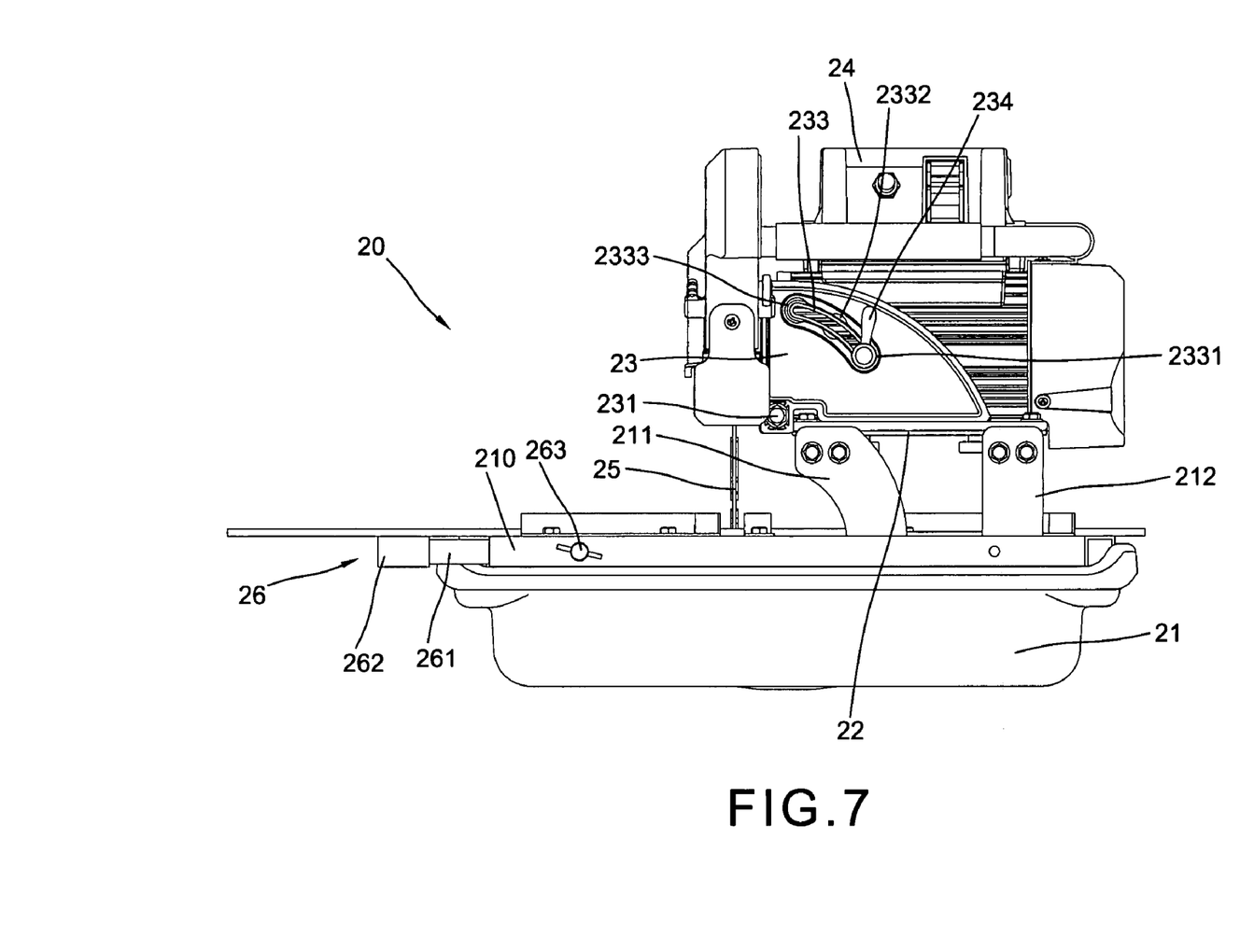
FIG. 7 is a side view to show that the blade is at a vertical position.

A piece of rectangular salver plate 22 slidably disposes on the top of the sliding bars 213 and has a plurality of rollers on underside engaged with the inner sides of the sliding bar 213, a pair of support arms 23 spacedly secured to the front and the rear end of the salver plate 22 by screws with a pair of pad plates 221 engaged therebetween. The support arms 23 each has a first circular through hole 232 in front lower portion and an arcuate slot 233 in an upper portion each having three circular through holes 2331, 2332 and 2333 spacedly formed therein. A motor 24 disposes on the top of the salver plate 22 between the support arms 23 and a screw hole 241 is formed in each of the opposing outer peripheries positioned at front lower portion engaged with the through holes 232 of the support arms 23 and rotatably secured by a pair of screws 231 so that the motor 24 is lever up on the screws 231, a pair of screw holes 242 in the opposing outer peripheries at a lower middle portion selectively engaged with any one of the three through holes 2331, 2332 and 2333 of the arcuate slots 233 and secured by a pair of handle locks 234 (as shown in FIGS. 6 and 7). A guarded blade 25 perpendicularly secured to an axis of the motor 24 and operated by the motor 24.

Figure 8:
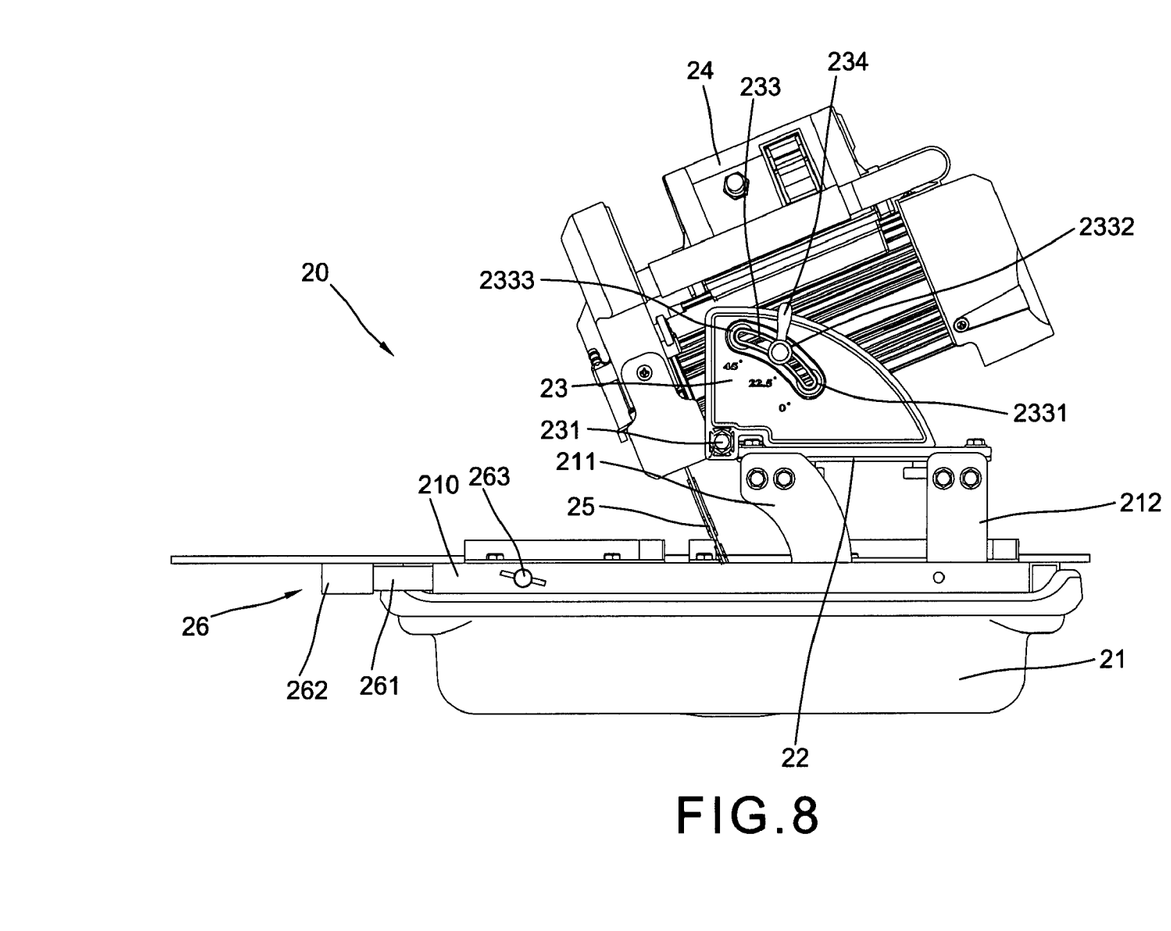
FIG. 8 is a side view to show that the blade is adjusted into a slanting angle for about 22.5 degrees.
Figure 9:
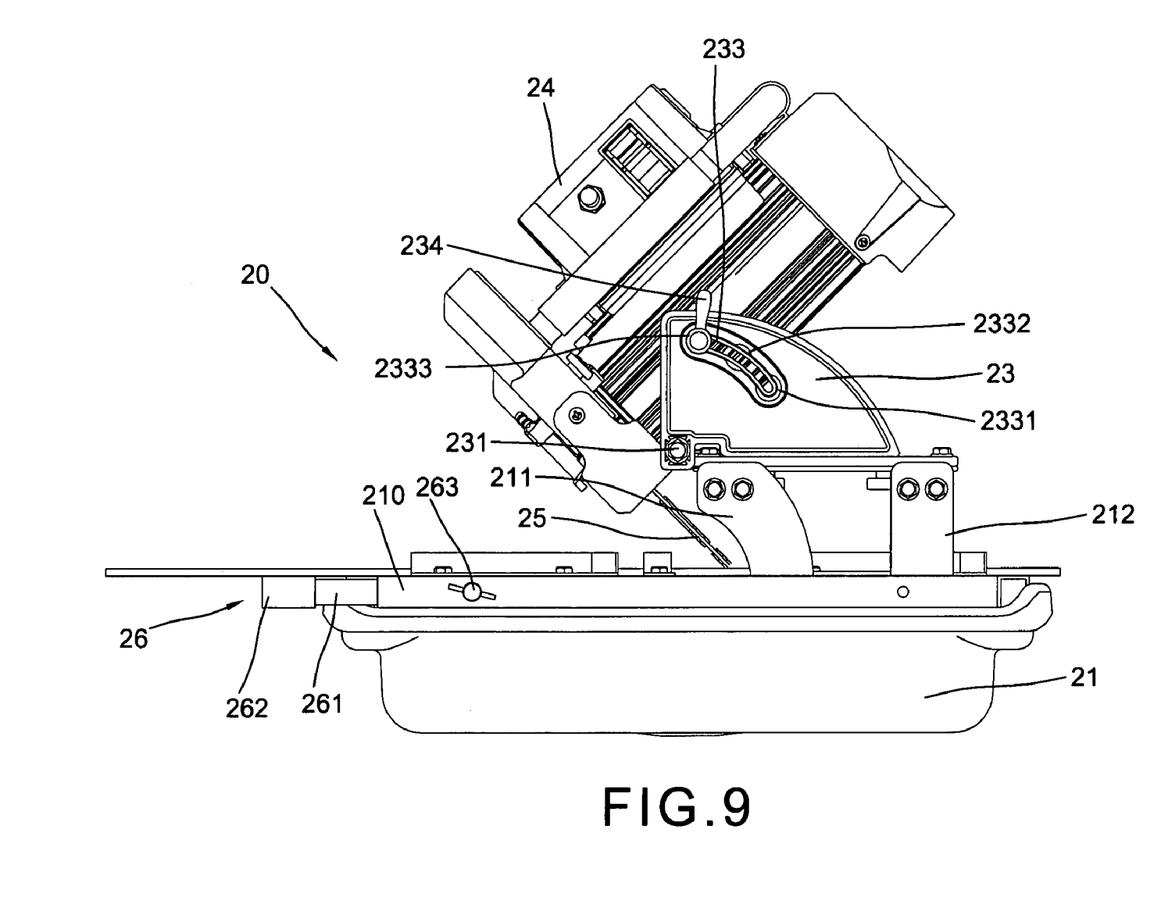
FIG. 9 is a side view to show that the blade is adjusted into a slanting angle for about 45 degrees.

The blade 25 is normally keeping vertical and engaged with the cutting groove 217 to cut the straight edges for the working pieces. If one wants to cut the working piece into a slanting edge, releases the handled locks 234 from the through hole 2331. Then the motor is leverly obliqued on the screws 231. Until the blade 25 engaged with the cutting groove 218 or 219, fasten the handle locks 234 again via the through hole 2332 or 2333 such that the slanting angle of the blade 25 is adjusted for about 22.5 or 45 degrees for cutting the slanting edges of the working pieces (as shown in FIGS. 8 and 9).

Figure 10:
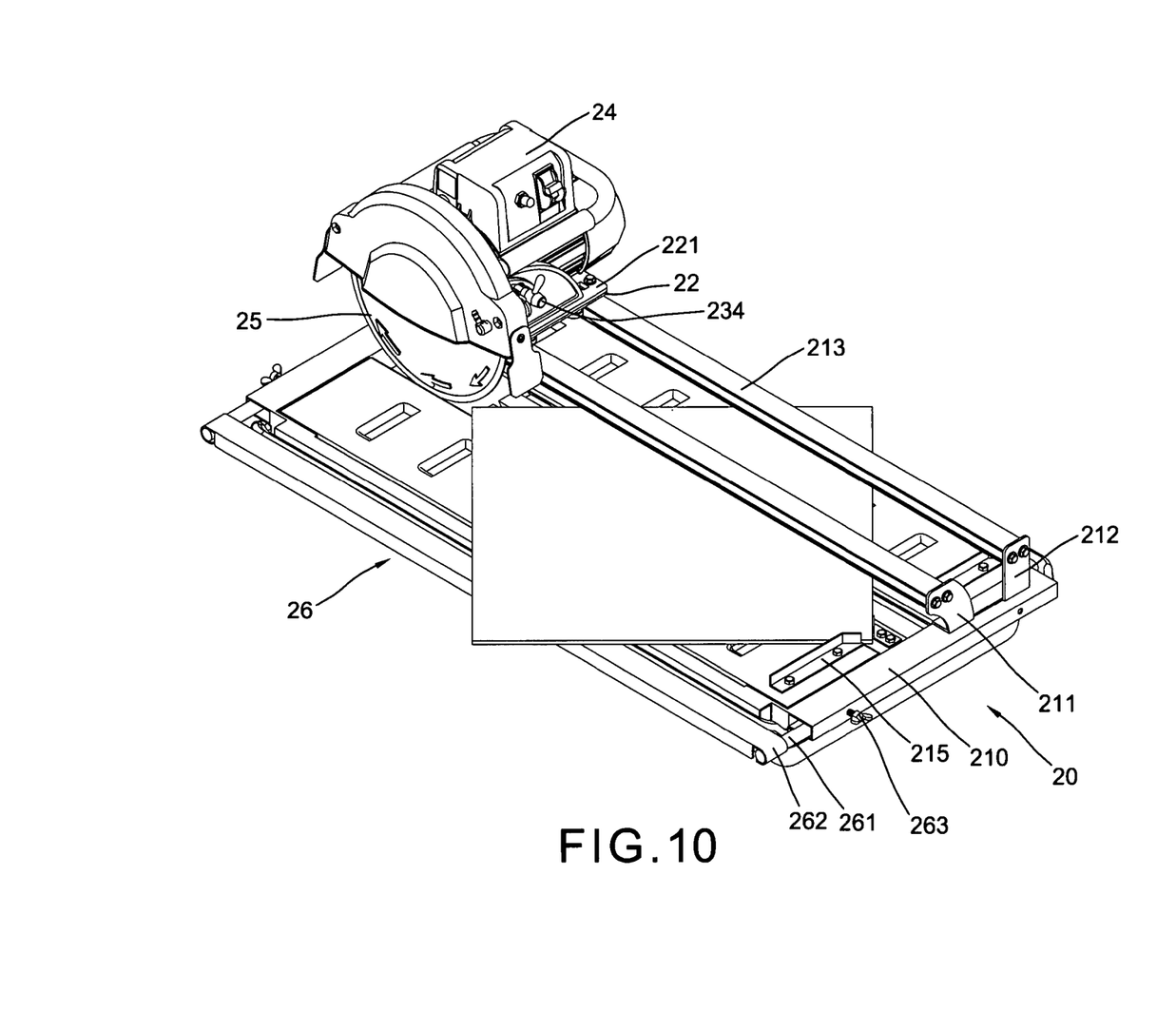
FIG. 10 is a perspective view to show a working piece being cutting on the top of the base.
Figure 11:
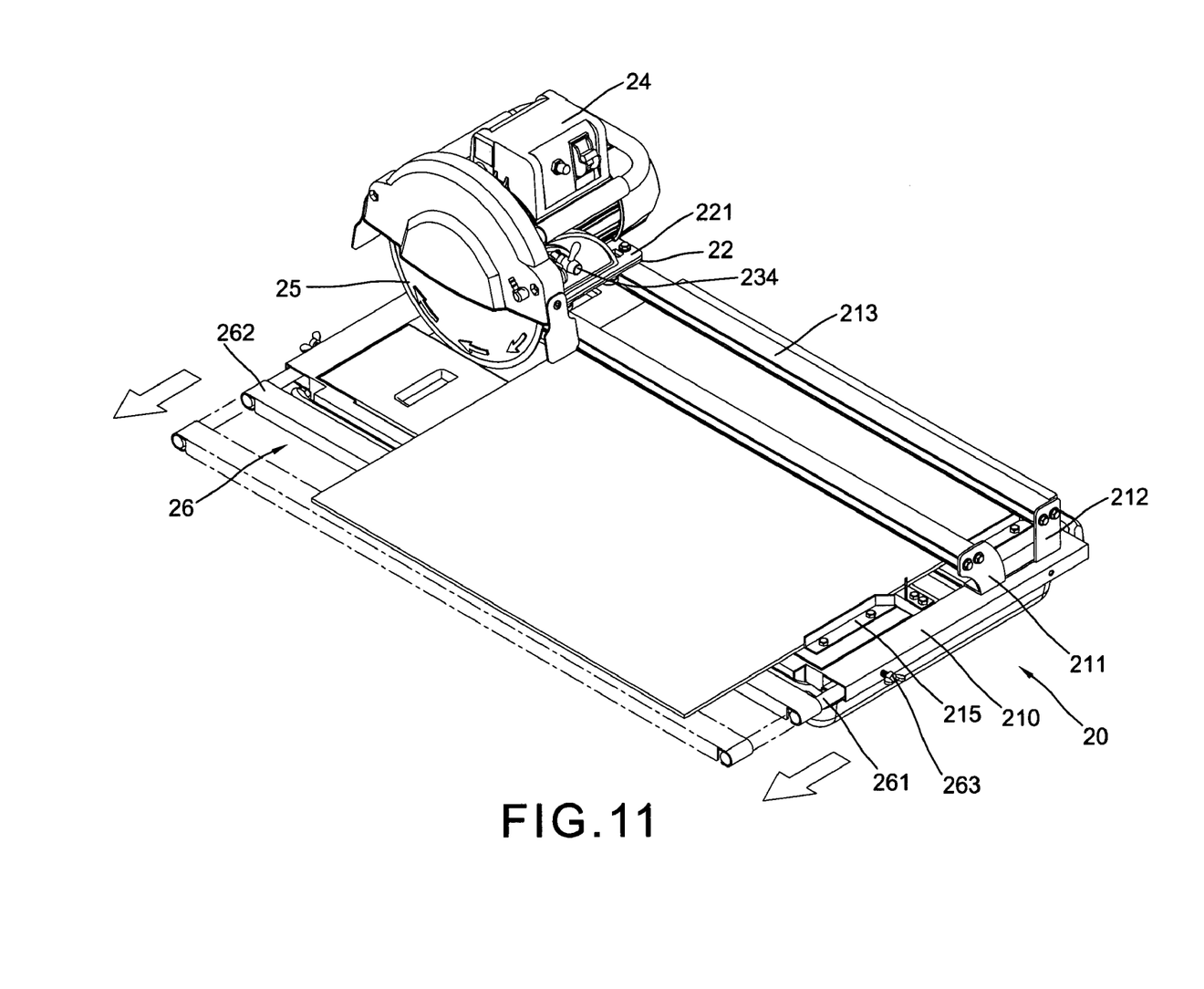
FIG. 11 is a perspective view that a U-shaped extension is extending outward to consist a large sized working piece being cutting on the top of the base.

FIG. 10 show a working piece is being cut, one edge of the working piece may leaned against the positioning plates 215 which are provide to prevent the working piece from horizontal movement during the cutting operation. If the working piece is too large to put on the top of the base 21, the U-shaped extension 26 is drawn out of the hollow interior bar 210 as a subordinate support to the working piece (as shown in FIG. 11). Then fasten the pair of handle locks 263 and begin to cut.

The structure of the stone cutter 20 of the present invention aim to load the weight of the motor 24 and blade 25 on the salver plate 22 and the support arms 23 instead of that suspending the motor 14 and the blade 15 from the lateral beam 13 as did by the prior art stone cutter. The handle lock adapted to fasten the motor 24 is superior to the knob lock 122 of the prior art too. Conclusively, the stone cutter 20 of the present invention provide convenient adjustment of the slanting angle for the blade 25 and more durability for the machine.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A stone cutter having blade angle adjustment device comprising:

a rectangular base having two ends, two pairs of support plates spacedly secured to said two ends, a pair of longitudinal sliding bars parallel secured to tops of the support plate, two alignment of rectangular through holes spacedly formed in said base, a sink disposed under said base, a plurality of positioning plates spacedly disposed on one end of said base, three longitudinal cutting grooves of different slanting sections spacedly formed in center of said base, a pair of hollow interior rectangular bars respectively disposed at two ends of said base, a U-shaped extension having a pair of lateral rods respectively and slidably inserted into said hollow interior rectangular bars and fastened by a pair of first handled locks;

a piece of rectangular salver plate slidably disposed on said longitudinal sliding bars having a plurality of rollers on underside engaged with inner sides of said sliding bars, a pair of support arms spacedly secured to a top adjacent front and rear edges of said salver plate with a pair of pad plates engaged therebetween, said support arms each having a first circular through hole in front lower portion and an arcuate slot in upper portion, each of said arcuate slot having three second circular through holes spacedly formed therein;

a motor secured to the top of said salver plate between said support arms having a first screw hole in each opposing lower periphery adjacent front end and respectively engaged with the first circular through holes of said support arms and pivotally secured by a pair of screws and a second screw hole formed in each opposing outer periphery positioned at a middle lower portion selectively engaged with one of the three circular through holes in said arcuate slot and fastened by a pair of second handle locks;

a guarded blade perpendicularly secured to an axis of said motor and engageable with each of said longitudinal grooves of said base;

whereby, the slanting angles of said blade is adjustable by engaging said second handle locks to different circular through holes in said arcuate slots.

2. The stone cutter as recited in claim 1, wherein said two alignment of rectangular through holes are provided to discharge the sawdust into said sink under said base.

* * * * *